United States Patent [19]

Ishibashi et al.

[11] 4,252,567
[45] Feb. 24, 1981

[54] GLASSES FOR EYEGLASS LENSES

[75] Inventors: Kazufumi Ishibashi, Sagamihara; Takeo Ichimura, Tokyo, both of Japan

[73] Assignee: Nippon Kogaku K.K., Tokyo, Japan

[21] Appl. No.: 73,380

[22] Filed: Sep. 7, 1979

Related U.S. Application Data

[63] Continuation-in-part of Ser. No. 883,644, Mar. 6, 1978, abandoned.

[51] Int. Cl.³ .............................................. C03C 3/08
[52] U.S. Cl. ................................. 106/47 Q; 106/54
[58] Field of Search ........................ 106/47 Q, 54, 53

[56] References Cited

U.S. PATENT DOCUMENTS

| | | | |
|---|---|---|---|
| 3,958,999 | 5/1976 | Izumitani et al. | 106/47 Q |
| 4,057,435 | 11/1977 | Boudot | 106/47 Q |
| 4,084,978 | 4/1978 | Sagara | 106/54 |

FOREIGN PATENT DOCUMENTS 1260712  2/1968  Fed. Rep. of Germany.

*Primary Examiner*—Helen M. McCarthy
*Attorney, Agent, or Firm*—Shapiro and Shapiro

[57] ABSTRACT

A glass for eyeglass lenses has a refractive index between 1.68 and 1.71, Abbe number between 41.6 and 46.5 and specific gravity between 2.88 and 3.14 and consists essentially of $B_2O_3$, CaO and at least one of $TiO_2$ and $Nb_2O_5$, the CaO being included in substantial amount.

3 Claims, No Drawings

GLASSES FOR EYEGLASS LENSES

This is a continuation-in-part of application Ser. No. 883,644 filed Mar. 6, 1978, now abandoned.

BACKGROUND OF THE INVENTION

1. Field of the Invention

This invention relates to glasses for eyeglass lenses, and is particularly directed to such glasses having high refractive index, low dispersion and low specific gravity.

2. Description of the Prior Art

Glasses for eyeglass lenses are disclosed in Japanese Patent laid open application Nos. 9012/1977 and 11210/1977. However, all of the glasses disclosed in these applications are of high dispersion. In the glasses of the former application, as Abbe number ($\nu d$) of only 41.5 can be obtained. The glasses are not of sufficiently low dispersion. Accordingly, when used lenses having a high diopter, or having high refractive power, the margins of the lenses are colored or chromatic aberration occurs. Looking through such a lens is effected. In the glasses of the latter application, the refractive index is not sufficiently high. In the glasses disclosed therein, the highest refractive index has an Abbe number of 41, which is not of sufficiently low dispersion and, similarly to the glasses disclosed in the former application, chromatic aberration occurs. Looking through the lens is effected.

U.S. Pat. Nos. 4,057,435 and 4,084,978 also disclose glasses for eyeglass lenses. However, the glasses of the former patent have high specific gravity. When a wearer puts on the spectacles having the glasses therein of the former patent, he feels discomfort due to the weight of the spectacles on his nose. The glasses of the latter patent have the disadvantage that chemical durability is poor. Long-term use of lenses made of such glasses of the latter patent causes the lens surface to have tarnish thereon, so that the lens can not be used.

SUMMARY OF THE INVENTION

Glass according to this invention has a refractive index (nd) of 1.68–1.71, Abbe number ($\nu d$) of 41.6–46.5 and specific gravity of 2.88–3.14. To obtain glasses for eyeglass lenses having high refractive index, low specific gravity and excellent chemical durability coupled with lower dispersion than heretofore known, $B_2O_3$, CaO and at least one of $TiO_2$ and $Nb_2O_5$ constitute the essential components with the CaO being present in a very substantial or large amount. Specifically, a glass according to the present invention includes either $TiO_2$ or $Nb_2O_5$, each of which imparts a high refractive index and low specific gravity to the glass, a large amount of CaO which imparts a high refractive index, low dispersion, and low specific gravity to the glass, and $B_2O_3$ of a glass net forming oxide which imparts low specific gravity to the glass and is capable of vitrifying a glass in the presence of the glass net modifying oxides, $TiO_2$, $Nb_2O_5$ and CaO. The using of $B_2O_3$ requires no alkali metal oxide as a flux to obtain a glass having excellent chemical durability.

DESCRIPTION OF THE PREFERRED EMBODIMENTS

In the glass of this invention, the indispensable components are $B_2O_3$, CaO, and at least one of $TiO_2$ and $Nb_2O_5$. The glass may contain additional components; for example, $SiO_2$, $Y_2O_3$, SrO, BaO, ZnO, $ZrO_2$, colorant, clarifier, etc.

The additional components each has the following functions.

$SiO_2$ furnishes the stability against devitrification and the enhancement for chemical durability. $Y_2O_3$ contributes to an increase in refractive index and to a decrease in dispersion. Each of SrO, BaO and ZnO or a combination thereof gives stability against devitrification. $ZrO_2$ increases refractive index and enhances chemical durability. A small amount of colorant prevents dazzling and improves the appearance of the lens.

The constitution of glass made in accordance with the invention in percent by weight is as follows:

$B_2O_3$: 22–45
CaO: 30–35
$TiO_2 + Nb_2O_5$: 8–16
(where $TiO_2$ ranges between 8 and 15 and $Nb_2O_5$ between 0 and 7)
$SiO_2$: 5–26
$Y_2O_3$: 0–2
$SrO + BrO + ZnO$: 0–7
$ZrO_2$: 0–11

A glass of the following components in percent by weight has stability against devitrification and is suitable for mass production:

$B_2O_3$: 22–24
CaO: 30–32
$TiO_2 + Nb_2O_5$: 13–16
(where $TiO_2$ ranges between 7 and 9 and $Nb_2O_5$ between 5 and 7)
$SiO_2$: 23–26
$Y_2O_3$: 0–2
SrO: 0–1
$ZrO_2$: 3–5

A glass of the following components in percent by weight is preferable for stability against devitrification:

$B_2O_3$: 23.70
CaO: 31.27
$TiO_2$: 8.21
$Nb_2O_5$: 6.41
$SiO_2$: 24.59
$Y_2O_3$: 1.00
SrO: 0.77
$ZrO_2$: 4.05

The comparison between U.S. Pat. Nos. 4,057,435 and 4,084,978 as prior art, which have been already shown, and the present invention is made as follows:

A glass of U.S. Pat. No. 4,057,435 includes $La_2O_3$ as an essential component, the $La_2O_3$ being present at least 9% by weight. $La_2O_3$ has disadvantage that specific gravity of a glass is made increased. For this reason, the glass of U.S. Pat. 4,057,435 has greater specific gravity than specific gravity of the present invention. U.S. Pat. No. 4,057,435 and the present invention have much the same refractive indexes. Specifically, comparing the glass of U.S. Pat. No. 4,057,435 to the glass made according to this invention, both glasses having the same refractive indexes, the glass of this invention has lower specific gravity than that of U.S. Pat. No. 4,057,435. For example, the glass shown in a first example of U.S. Pat. No. 4,057,435 has a refractive index (nd) of 1.69987 and specific gravity of 3.048. In contrast, the glass shown in fourth example of this invention has a refractive index (nd) of 1.7006 and specific gravity of 2.910. It can be seen that the glass of this invention has by far lower specific gravity. A glass of U.S. Pat. No. 4,084,978 has alkali metal oxide as an essential component. Alakli metal oxide has the disadvantage that chemical durability of a glass is decreased or deteriorated. In the glass according to the present invention, $B_2O_3$ which is a glass net forming oxide is used as an essential component. $B_2O_3$ has capability of forming a glass at a low fusing temperature, so that no flux such as alkali metal oxide is required.

Glasses according to this invention are manufactured by using the corresponding oxides, carbonates, nitrates, etc., for each of the materials of respective components, mixing sufficiently at desired rates, balancing these components together with, if necessary, clarifier, and putting the resultant mix into a platinum crucible which is placed in an electric furnace heated at a temperature of 1300°–1400° C. After clarifying the mix, stirring and unifying it, and then molding in an iron mold, the charge is cooled slowly.

The components (% by weight), refractive index (nd), Abbe number (νd) and specific gravity of a number of examples of glasses made in accordance with the invention are shown in the following Table:

|  | 1 | 2 | 3 | 4 | 5 |
|---|---|---|---|---|---|
| $B_2O_3$ | 24.38 | 24.67 | 43.46 | 44.02 | 23.70 |
| CaO | 31.52 | 31.03 | 34.92 | 34.50 | 31.27 |
| $TiO_2$ | 8.39 | 12.19 | 11.44 | 14.05 | 8.21 |
| $Nb_2O_5$ |  |  |  |  | 6.41 |
| $SiO_2$ | 25.30 | 25.60 | 5.63 | 6.63 | 24.59 |
| $Y_2O_3$ |  |  |  |  | 1.00 |
| SrO |  | 1.60 | 0.79 | 0.80 | 0.77 |
| BaO |  | 3.66 |  |  |  |
| ZnO |  | 1.25 |  |  |  |
| $ZrO_2$ | 10.41 |  | 3.76 |  | 4.05 |
| nd | 1.6917 | 1.6892 | 1.6990 | 1.7006 | 1.7012 |
| νd | 44.4 | 42.8 | 43.2 | 41.6 | 42.4 |
| specific gravity | 3.016 | 3.004 | 2.945 | 2.910 | 3.048 |

As explained in the foregoing, the glasses for eyeglass lenses having a high refractive index, low dispersion and low specific gravity may be industrially manufactured, which are stable against devitrification, and which are chemically durable. Various modifications and changes may be made without departing from the spirit and scope of the invention as sought to be defined in the following claims.

What we claim is:

1. A glass for eyeglass lenses having a refractive index (nd) of 1.68–1.71, Abbe number (νd) of 41.6–44.4, specific gravity of 2.91–3.05 and consisting essentially of, in percent by weight:
   $B_2O_3$: 22–45
   CaO: 30–35
   $TiO_2 + Nb_2O_5$: 8–16
   (Where $TiO_2$ ranges between 8 and 15 and $Nb_2O_5$ between 0 and 7)
   $SiO_2$: 5–26
   $Y_2O_3$: 0–2
   $SrO + BaO + ZnO$: 0–7
   $ZrO_2$: 0–11
   and which is devoid of alkali metal oxide.

2. A glass for eyeglass lenses according to claim 1, having a refractive index (nd) of 1.70–1.71, Abbe number (νd) of 42.0–43.5, specific gravity of 3.00–3.05, and wherein the following components are present in the stated amounts in percent by weight:
   $B_2O_3$: 22–24
   CaO: 30–32
   $TiO_2 + Nb_2O_5$: 13–16
   (Where $TiO_2$ ranges between 8 and 9 and $Nb_2O_5$ between 5 and 7)
   $SiO_2$: 23–26
   $Y_2O_3$: 0–2
   SrO: 0–1
   $ZrO_2$: 3–5.

3. A glass for eyeglass lenses according to claim 2, having a refractive index (nd) of 1.7012, Abbe number (νd) of 42.4, specific gravity of 3.048, and wherein the following components are present in the stated amounts in percent by weight:
   $B_2O_3$: 23.70
   CaO: 31.27
   $TiO_2$: 8.21
   $Nb_2O_5$: 6.41
   $SiO_2$: 24.59
   $Y_2O_3$: 1.00
   SrO: 0.77
   $ZrO_2$: 4.05.

* * * * *